United States Patent [19]

Fowler et al.

[11] Patent Number: 4,978,708

[45] Date of Patent: Dec. 18, 1990

[54] AQUEOUS-BASED COATING COMPOSITIONS COMPRISING ANIONIC POLYURETHANE PRINCIPAL RESIN AND ANIONIC ACRYLIC GRIND RESIN

[75] Inventors: Chris W. Fowler, Walled Lake; Michael C. Knight, Centerline; Anthony J. Nicholas, Clawson, all of Mich.

[73] Assignee: BASF Corporation, Clifton, N.J.

[21] Appl. No.: 343,119

[22] Filed: Apr. 25, 1989

[51] Int. Cl.$^5$ .............................................. C08L 75/04
[52] U.S. Cl. ................................... 524/507; 427/409; 427/435; 427/372.2; 427/407.1; 428/460; 428/458; 428/423.1
[58] Field of Search ...................... 524/507; 427/407.1, 427/409, 435, 372.2; 428/460, 458, 423.1

[56] References Cited

U.S. PATENT DOCUMENTS

| | | | |
|---|---|---|---|
| 4,007,306 | 2/1977 | Poy et al. | 427/377 |
| 4,791,168 | 12/1988 | Salatin et al. | 524/601 |
| 4,794,147 | 12/1988 | Savino et al. | 525/440 |
| 4,914,148 | 4/1990 | Hille et al. | 524/507 |

*Primary Examiner*—Edith Buffalow
*Attorney, Agent, or Firm*—Jerry F. Janssen

[57] ABSTRACT

Aqueous-based basecoat compositions, useful for application to metal and/or plastic substrates, comprise an anionic polyurethane principal resin and an anionic acrylic pigment grind resin. The compositions are particularly adapted to application to substrates over a wide range of ambient humidities and have quick drying characteristics. The incorporation of an anionic acrylic grind resin, which is compatible with the anionic polyurethane principal resin, produces a coating which has good pigment wetting and dispersion characteristics with improved shelf life and color stability.

22 Claims, No Drawings

AQUEOUS-BASED COATING COMPOSITIONS COMPRISING ANIONIC POLYURETHANE PRINCIPAL RESIN AND ANIONIC ACRYLIC GRIND RESIN

FIELD OF THE INVENTION

The present invention relates to water-borne decorative and/or protective coating systems. In particular, it concerns aqueous-based coating compositions comprising an anionic polyurethane principal resin and an anionic acrylic pigment grind resin, a method of coating, and coatings produced thereby, all of which are particularly adapted for use in the field of automotive coatings.

BACKGROUND OF THE INVENTION

Multi-layer coating systems have been utilized to coat automobiles for a number of years but, during the early years of the development of these systems, the solvents were organic. As environmental regulations have become more stringent, and the costs of organic solvents have risen, organic solvent-borne coating systems have become less desirable. Recent research efforts in the field of coating compositions for automotive multi-layer coatings have thus focused on the development of water-borne systems.

The shift from organic solvents to water for dispersing and applying resins in multi-layer coating systems has solved many of the environmental and cost problems typically associated with the use of organic solvents, yet water-borne coating systems are not without problems of their own.

The application of a multi-layer coating to a metal substrate such as an automobile body is greatly facilitated by coating systems which have quick drying characteristics, both during and after application of each coating layer. For example, a quick drying coating system permits application over a broad range of ambient humidities while minimizing problems of flow and sag. The resulting lack of any need to carefully control humidity in the spray zone lowers energy costs. Moreover, a quickdrying system shortens the waiting time required between coating layers and lowers the temperature required for any flash drying steps which may be required between the steps of applying multiple coating layers. In early coating systems, these advantages were achieved by the use of low boiling organic solvents. However, with the shift to water-borne coating systems, the more difficult drying of water from a coating film has presented problems. Because of the tendency of water to hydrogen-bond to polar functional groups in the coating composition and the higher heat capacity and boiling point of water, higher temperatures and more heat energy are required to remove the solvent from the coating during drying and curing steps. This means that longer drying times are required between the application of successive coating layers in a multi-layer coating system or, alternatively, flash drying steps of high temperature or longer duration between such applications of successive layers. In so-called "wet-on-wet" multi-coat systems in which two or more coatings are applied to the substrate without intermediate curing of each coat, water which remains in underlying layers after the application of overlying layers tends to boil out during the baking or curing step. This solvent popping disrupts the overlying layer(s) and results in an undesirable rough, uneven surface to the finished coating.

Because of the ease with which acrylic-based polymers can be dispersed in water, early research efforts in water-borne coatings focused on these polymers as the resins of choice in water-borne systems. However, coating compositions based on acrylic polymers have a greater tendency to trap and retain water. Moreover, because of their tendency to retain water, water-borne acrylic coating systems generally must be applied within a narrow range of ambient humidities in order to prevent sagging or flowing of the film during application. For example, U.S. Pat. No. 4,007,306 discloses a method of applying an aqueous all-acrylic coating composition to metal substrates which is limited to ambient humidities ranging between about 40% and 60%.

To overcome the aforementioned disadvantages of water-borne acrylic systems, research efforts have turned toward the development of water-borne coating compositions which are based upon resins other than acrylics. U.S. Pat. Nos. 4,794,147 and 4,791,168, for example, disclose water-borne coating systems based upon all-polyurethane chemistry.

Non-acrylic water-borne coating systems are attractive because they can be formulated to possess a degree of hydrophobicity which overcomes the water-retaining disadvantages characteristic of acrylic water-borne systems. The resulting coating compositions can thus be applied over a wider range of ambient humidity without sagging. However, the optimization of this property of non-acrylic water-borne coating systems often leads to resins which do not adequately wet the surface of pigmenting agents which are incorporated into the coating compositions, frequently leading to coating compositions which have lower shelf life and/or color stability. In general, increasing the hydrophobicity of the coating system to reduce interaction with the aqueous solvent tends to simultaneously reduce the ability of the resin to interact with and wet the surface of highly polar pigments. In such coating systems, this problem can be overcome, but usually requires burdensome or time consuming pigment grinding conditions to form pigment pastes. Even when such precautions are taken in preparing pigment pastes in many non-acrylic systems, problems are often observed relating to pigment particle agglomeration, and shortening of the effective shelf life of the pigment paste and/or coating composition.

It is therefore an object of the present invention to provide an aqueous based or water-borne coating composition for metal and/or plastic substrates which overcomes the various disadvantages of prior art all-acrylic or all-polyurethane water-borne coating systems and which provides a coating which can be applied over a wide range of ambient humidities, and which has good pigment wetting and dispersion characteristics with improved shelf life and color stability.

SUMMARY OF THE INVENTION

These, and other advantages are achieved in accordance with the present invention which provides, in one embodiment, a water-borne coating composition particularly adapted for use as the pigmented basecoat in a multi-coat coating system. The coating compositions of the present invention possess a broad humidity window for application with superior pigment wetting and dispersion characteristics and improved shelf life and color stability.

The basecoat coating compositions of the present invention comprise (A) from about 5% to about 60% of an anionic polyurethane principal resin, (B) from about 5% to about 50%, of an aminoplast cross-linking resin, (C) from about 5% to about 35% of a branched polyester resin, (D) from about 2% to about 75% of an anionic acrylic grind resin, and (E) from about 5% to about 30% pigment. All percentages are by weight, based upon the total solids content of the final basecoat coating composition.

The Anionic Polyurethane Principal Resin

The anionic polyurethane principal resin comprises the reaction product of (1) a polyester component comprised of the reaction product of a carboxylic acid component and an alcohol having at least two hydroxyl groups; (2) a multi-functional compound having at least one active hydrogen and at least one carboxylic acid functionality; (3) a compound having at least two active hydrogen groups selected from the group consisting of hydroxyl, sulfhydryl, primary amine, and secondary amine, said primary amines accounting for one active hydrogen; and (4) a polyisocyanate.

The carboxylic acid component of the polyester component is comprised of at least about 50% by weight of at least one long-chain carboxylic acid of from between 18 and 60 carbon atoms, and at most about 50% by weight of at least one short-chain dicarboxylic acid.

The Branched-Chain Polyester Component

The branched chain polyester resin, which is present in the basecoat coating compositions of this invention, comprises the reaction product of (1) a polyester component and (2) a polyfunctional carboxylic acid or acid anhydride.

The polyester component is the reaction product of a carboxylic acid component and an alcohol component having an average functionality of at least two. The carboxylic acid reactant is comprised of at least 50% by weight of at least one long-chain carboxylic acid of from 18 to 60 carbon atoms, and not more than 50% by weight of at least one short-chain dicarboxylic acid.

The polyfunctional carboxylic acid or acid anhydride contains at least three carboxylic acid or incipient carboxylic acid groups, present as anhydride groups.

The Anionic Acrylic Grind Resin

The anionic acrylic grind resin comprises the reaction product of (1) from about 60% to about 90%, by weight of one or more monomers selected from the group consisting of a $C_1$ to $C_{20}$ alkyl acrylates or methacrylates, styrene, and vinyl toluene; (2) from about 5% to about 35% by weight of a reactive monomer of the group consisting of hydroxyethyl, hydroxypropyl and glycidyl esters of acrylic and methacrylic acids; and (3) from about 5% to about 20% by weight of an $\alpha,\beta$-unsaturated carboxylic acid of the group consisting of acrylic acid, methacrylic acid, maleic anhydride and fumaric acid.

The anionic acrylic copolymer possesses an acid number greater than about 30, preferably between about 30 and 70, a weight average molecular weight in the range of about 30,000 to about 70,000 and a $T_g$ ranging between about $-20°$ C. and about $+20°$ C.

DETAILED DESCRIPTION

PRINCIPAL RESIN

The anionic polyurethane resins which comprise the principal resins of the coating compositions of the present invention are comprised of, in part, polyester resins formed from a carboxylic acid component and a alcohol having at least two hydroxyl moeities Specifically, the principal anionic polyurethane resins of this invention comprise:

1. A polyester component produced by condensing a carboxylic acid component with alcohols having at least two hydroxy moeities wherein the carboxylic acid component is comprised of at least about 50% by weight of a long chain hydrophobic carboxylic acid containing compound having between 18 to 60 carbon atoms; and 2. A mixture of a compound having at least two isocyanate groups, a multi-functional compound having at least one active hydrogen functionality and at least one carboxylic acid functionality and optionally, a compound having at least two active hydrogen groups, for example, diols, dithiols, diamines, or compounds having mixtures of these active hydrogen groups, the polyester component described above being reacted with this mixture to produce a polyurethane resin containing free carboxylic acid groups. The free carboxylic acid groups may be neutralized to produce a water-dispersible polyurethane resin.

The polyester component is preferably formed from an alcohol component having at least about two hydroxy groups per molecule (polyol) and a carboxylic acid component. The carboxylic acid component is comprised of at least about 50% by weight of a long chain carboxylic acid containing compound having between 18 and 60 carbon atoms in the chain. This long-chain carboxylic acid component is an alkyl, alkylene, aralkyl, aralkylene, or compound of similar hydrophobicity having 18 to 60 carbons in the chain. The polyester chain may be branched, but it is preferred that chain-branching be kept to a minimum. It is recognized that low flash and quick-drying characteristics of the basecoat compositions of this invention are the result of having a high percentage of highly hydrophobic groups in the polyester resin. Carboxylic acids of $C_{18}$ to $C_{60}$ carbon content present a range of compounds having suitable hydrophobicity. Most preferably, this long chain carboxylic acid is a dicarboxylic acid and most preferably is a $C_{36}$ dicarboxylic acid known as a dimer acid. The remaining carboxylic acid may be comprised of a short-chain monocarboxylic or dicarboxylic acid component, preferably a dicarboxylic acid. When monocarboxylic acid compounds are used, these function as polyester chain terminators. Thus, where high molecular weight polyesters are desired, the amount of monocarboxylic acid is kept to a minimum. The short-chain dicarboxylic acid may be preferably short-chain alkyl or alkylene dicarboxylic acid, for example, azeleic acid, adipic acid, or an equivalent aliphatic dicarboxylic acid or an aromatic dicarboxylic acid. Most preferably, the aromatic dicarboxylic acid is isophthalic acid. It must be stressed that while a number of short-chain carboxylic acid compounds may be used, the ultimate goal is to maintain the hydrophobic, quick-flash characteristics of the polyester resin.

The composition of the carboxylic acid component and polyol component employed to synthesize the polyester resins are present in such amounts as to provide an excess of the polyol over and above the total number of equivalents of acid present in the mixture. In other words, the reactants should be selected, and the stoichiometric proportions of the respective acid and polyol components should be adjusted, to give hydroxy-terminated, polyester molecules each theoretically having a hydroxyl functionality of two or more.

As stated above, the acid mixture employed in forming the polyester intermediate most preferably contains a $C_{36}$ dicarboxylic acid product known as dimer acid. Processes for forming this acid are well known and form the subject of numerous U.S. patents including U.S. Pat. Nos. 2,482,761, 2,793,220, 2,793,221 and 2,995,121. Alternatively, dimer fatty acid can be purchased from a chemical supply house (Empol 1010, available from Emery Chemical Co.)

The $C_{36}$ dimer fatty acid fraction consists essentially of dimer ($C_{36}$ dicarbocylic acids) together with amounts up to about 20-22% of $C_{54}$ trimer. However, those of skill in the art refer to this dimer-trimer mixture as "dimer", and this practice is followed herein. The preferred grade contains 97% dimer and 3% trimer. These polymerization reaction products can be used in the form in which they are recovered from the polymerization unit, or they can be given a partial or complete hydrogenation treatment to reduce unsaturation before being reacted with the polyol compound to form the polyester. Polyesters so formed can then be used to form a polyurethane resin which can be used in basecoat formulations exhibiting low flash, quick-drying characteristics.

The polyurethanes of the present invention are advantageously storage stable and are, of course, water dispersible. The water dispersibility of the resins is controlled by the amount of free carboxylic acid contained in the final resin particles, and the number of salt groups formed from those free acid groups.

Coating compositions produced using the polyurethane resins described herein have exhibited low flash and quick drying characteristics surprising for a water-dispersible resin.

The water dispersible anionic polyurethane principal resin of this invention is produced by reacting a polyester component comprised of at least 50% by weight of the carboxylic acid component of a long chain carboxylic acid containing compound with a mixture of a polyisocyanate-containing compound, a multifunctional compound having at least one active hydrogen functionality and at least one carboxylic acid functionality, and optionally, an additional component comprising a compound having at least two active hydrogen containing moieties. The resulting polyurethane intermediate has terminal isocyanate groups or active hydrogen-containing moieties, depending upon the stoichiometry of the polyester mixture described above.

An especially preferred embodiment of the polyurethane resins of the present invention relates to the formation of a urethane product in which the intermediate polyurethane resin described above has free isocyanate groups, at the terminal positions of the polyurethane resin. The isocyanate groups are then capped with an excess of a polyfunctional alcohol having at least two alcohol groups, and preferably at least three alcohol groups.

The particular characteristics of the polyurethane resins are determined by the components of the polyester resin. It has unexpectedly been discovered that polyester resins produced from a carboxylic acid component comprised of at least about 50% by weight of a long-chain fatty acid or dicarboxylic acid having between about 18 and 60 carbon atoms can be formulated into water-dispersible polyurethane principal resins exhibiting particularly favorable low flash and quick drying properties for water borne basecoat resins.

The acid component of the polyester is, of course, critical to the invention and is comprised of a mixture of at least about 50% by weight of a long chain carboxylic acid component having between 18 and 60 carbon atoms. Preferably, the long chain carboxylic acid is a dicarboxylic acid and most preferably, the dicarboxylic acid is a $C_{36}$ dimeric dicarboxylic acid or dimer acid. Where the long chain carboxylic acid comprises less than 100% of the carboxylic acid component, the carboxylic acid component is also comprised of one or more short-chained carboxylic acids.

Preferably, the long chain fatty acid comprises between about 50 and 80% by weight of the acid component of the polyester polyol. In the principal resin (major vehicle) the long chain fatty acid component comprises about 75-80% of the polyester resin. Generally, the higher the percentage of long chain carboxylic acid, the better the quick-drying or flash off characteristics of the final polyurethane resin. However, the advantageous flash-off characteristics must be balanced with the effect that the change in the carboxylic acid component has on the metallic effects, durability and other characteristics of the resin.

The shorter chain carboxylic acid component is comprised of a mono-, di- or higher functionality carboxylic acid or a mixture of these carboxylic acids having carbon chains of twelve or fewer carbon units. Monocarboxylic acids function to terminate a polyester and are chosen for that purpose. It is preferable that the short chain carboxylic acid component be a dicarboxylic acid. Such preferred dicarboxylic acid compounds include, for example adipic, azeleic, and other aliphatic dicarboxylic acids. Aromatic dicarboxylic acids are also preferred. An especially preferred aromatic dicarboxylic acid is isophthalic acid. Alkylene and aralkylene carboxylic acids can also be used. Where branch chains in the polyester are desired, a carboxylic acid containing three or more carboxylic acid groups, or incipient carboxylic acid groups, present as anhydride groups. A preferred acid of this type is trimellitic anhydride, i.e. the 1,2-anhydride of 1,2,4-benzenetricarboxylic acid.

The polyester resins are synthesized from the above-described carboxylic acid component and an excess of a polyol component. An excess of polyol is used so that the polyester resin preferably contains terminal hydroxyl groups. The polyol compounds preferably have an average hydroxy-functionality of at least two.

The polyester resin in most cases is comprised of one or more polyols, preferably a diol. Up to about 25% by weight of the polyol component may be a polyol having three or more hydroxy groups per molecule. Where polyols having three or more hydroxy group are chosen, the result is a branched polyester.

While it is not always desirable to have a triol or higher multi-functional alcohol present because of the tendency to form a branched chain polyester, some branching may be desirable. The polyester resin should not be highly branched, however. There may also be present a small amount of monoalcohol, in the polyol component, particularly if larger proportions of higher functional alcohols are used. These monoalcohols serve as chain terminators. In certain instances, for example, where certain high molecular weight polyols are used, the polyols can be largely or even entirely made up of compounds of functionality greater than two.

The diols which are usually employed in making the polyester resins include alkylene glycols, such as ethylene glycol, propylene glycol, butylene glycol, and neopentyl glycol, 1,6-hexanediol and other glycols such as hydrogenated bisphenol A, cyclohexane dimethanol, caprolactone diol (i.e., the reaction product of caprolactone and ethylene glycol), hydroxyalkylated bisphenols, and the like. However, other diols of various types and, as indicated, polyols of higher functionality may also be utilized. Such higher functional alcohols can include, for example, trimethylolpropane, trimethylolethane, pentaerythritol and the like, as well as higher molecular weight polyols.

The low molecular weight diols which are preferred in the instant invention are known in the art. They have hydroxy values of 200 or above, usually within the range of 200 to 2000. Such materials include aliphatic diols, particularly alkylene polyols containing from 2 to 18 carbon atoms. Examples include ethylene glycol, 1,4-butanediol, cycloaliphatic diols such as 1,2-cyclohexanediol and cyclohexane dimethanol. An especially preferred diol is 1,6-hexanediol.

The resulting polyester resin is preferably produced with dimer fatty acid as the long chain carboxylic acid, isophthalic acid as the minor short-chain carboxylic acid component component and an excess of 1,6-hexanediol so that the resulting polyester polyol ranges in size between about 200 and 2000 grams per equivalent of hydroxyl. Preferably, the polyester resin has a range between 700 and 800 grams per equivalent of hydroxyl and most preferably, has about 750 grams per equivalent of hydroxyl.

To produce the polyurethane resins which are useful in basecoat compositions of the present invention, the above-described polyester polyol is reacted with a mixture of a polyisocyanate, a multi-functional compound having at least one active hydrogen group and at least one carboxylic acid group, and optionally, a component comprising a chemical compound having at least two active hydrogen groups, but no carboxylic acid groups.

The polyester, polyisocyanate and multi-functional compound may also be reacted in the same pot, or may be reacted sequentially, depending upon the desired results. Sequential reaction produces resins which are more ordered in structure. Both the polyester and multi-functional compound may serve as chain extenders to build up the polyurethane backbone through reaction of hydroxyl groups with isocyanate groups. However, to function as a chain extender, the multi-functional compound must have at least two active hydrogen groups. Where the multi-functional compound has only one active hydrogen group, the result is chain termination. Additional chain extenders having at least two active hydrogen groups but no carboxylic acid groups may be added to increase the chain length or to change the chemical characteristics of the polyurethane resin. In general, an excess of polyurethane resin can be produced having free isocyanate groups at the terminal ends. The free isocyanate groups may then be preferably capped with trimethylolpropane or diethanolamine.

The organic polyisocyanate which is reacted with the polyhydric material as described is essentially any polyisocyanate and is preferably a diisocyanate, e.g., hydrocarbon diisocyanates or substituted hydrocarbon diisocyanates. Many such organic diisocyanates are known in the art, including biphenyl-4,4'-diisocyanate, toluene diisocyanate, 3,3'-dimethyl-4,4-biphenylene diisocyanate. 1,4-tetramethylene diisocyanate, 1,6-hexamethylene diisocyanate, 2,2,4-trimethylhexane-1,6-diisocyanate, methylene-bis-(phenylisocyanate), 1,5-naphthalene diisocyanate, bis-(isocyanatoethyl fumarate), isophorone diisoxyanate (IPDI), and methylene-bis-(4-cyclohexylisocyanate). Isocyanate terminated adducts of polyols can also be employed, such as adducts of polyols including ethylene glycol, 1,4-butylene glycol, trimethylolpropane etc. These are formed by reacting more than one mol of a diisocyanate, such as those mentioned, with one mol of polyol to form a longer chain diisocyanate. Alternatively, the polyol can be added along with the diisocyanate.

While diisocyanates are preferred, other multi-functional isocyanates may be utilized. Examples are 1,2,4-benzene triisocyanate and polymethylene polyphenyl isocyanate.

It is preferred to employ an aliphatic diisocyanate, since it has been found that these provide better color stability in the finished coating. Examples include 1,6-hexamethylene diisocyanate, 1,4-butylene diisocyanate, methylene-bis-(4-cyclohexylisocyanate) and isophorone diisocyanate. Mixtures of diisocyanates can also be employed.

The proportions of the diisocyanate, polyester, and multi-functional compound are chosen so as to provide an isocyanate terminated intermediate polyurethane resin. This can be accomplished by utilizing a stoichiometric excess of polyisocyanate, i.e., more than one isocyanate group per nucleophilic moiety (group reactive with isocyanate) in the other components.

For purposes of promoting water-solubility it is important to build acid groups into the polyurethane. For example, the presence of acid groups renders the composition water-dilutable.

The acids that are employed to provide free acid groups in the polyurethane resins of this invention are readily available. They contain at least one active hydrogen group and at least one carboxylic acid functionality. The active hydrogen group may be a thiol, a hydroxyl or an amine, with primary amines being considered to have one active hydrogen group. Examples of such compounds include hydroxyl carboxylic acids, amino acids, thiol acids, aminothiol acids, alkanolamino acids, and hydroxythiol acids.

Compounds containing at least two hydroxyl groups and at least one carboxylic acid are preferred. They can be prepared from an aldehyde that contains at least two hydrogens in the alpha position. Such aldehydes are reacted in the presence of a base catalyst with two equivalents of formaldehyde to form an 2,2-hydroxymethyl aldehyde. The aldehyde is then gently oxidized to the acid by known procedures. The acids that are employed in the invention can be represented in simplification by formula I:

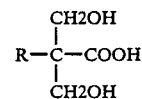

wherein R represents hydroxymethyl, hydrogen, or an alkyl group of up to 20 carbon atoms and preferably up to 8 carbon atoms.

Specific illustrative examples of such acids that are employed in the invention include 2,2-bis-(hydroxymethyl) acetic acid, 2,2,2-tris-(hydroxymethyl)-acetic acid, 2,2-bis-(hydroxymethyl)propionic acid, 2,2-bis- (hydroxymethyl)butyric acid 2,2-bis-(hydroxymethyl)-pentanoic acid and the like. The preferred acid is 2,2-bis-(hydroxymethyl)propionic acid.

Longer-chain polyurethane resins can be obtained by chain extending the polyurethane chain with a compound or mixture of compounds containing at least two active hydrogen groups but having no carboxylic acid group, for example diols, dithiols, diamines, or compounds having a mixture of hydroxyl, thiol and amine groups, for example, alkanolamines, aminoalkyl mercaptans, and hydroxyalkyl mercaptans, among others. For purposes of this aspect of the invention both primary and secondary amine groups are considered as having one active hydrogen. Alkanolamines, for example, ethanolamine or diethanolamine, are preferably used as chain extenders, and most preferably a diol is used. Examples of preferred diols which are used as polyurethane chain extenders include 1,6-hexanediol, cyclohexanedimethylol, and 1,4-butanediol. A particularly preferred diol is neopentyl glycol. Of course, the same diols used to synthesize the polyester component of the polyurethane resins can be utilized here as well. While polyhydroxy compounds containing at least three hydroxyl groups may be used as chain extenders, the use of these compounds produces branched polyurethane resins. For purposes of the present invention, it is preferred to minimize the amount of branching in the polyurethane resin. Therefore, if polyhydroxy compounds are used, they are preferably limited to a very minor component of the polyurethane producing mixture. These higher functional polyhydroxy compounds include, for example, trimethylolpropane, trimethylolethane, pentaerythritol, among other compounds.

The polyurethane resin may be chain extended in any manner using these compounds having at least two active hydrogen groups. Thus, these compounds may be added to the mixture of polyisocyanate polyester and multi-functional compound, or alternatively, may react at an intermediate stage, to link two free isocyanate groups that are present at the terminal ends of an intermediate polyurethane resin.

It is generally preferred that an intermediate polyurethane resin produced by reacting the polyester resin and the mixture of polyisoyanate, multi-functional compound containing at least two hydroxyl groups and one carboxylic acid group, and chain extender be terminated with free isocyanate groups. To accomplish this an excess of the polyisocyanate component is used. Of course, the molar ratio of the other components will be adjusted according to the desired characteristics of the intermediate and final polyurethane resins. The polyester component comprises no more than about 80% by weight of the reaction mixture and it is preferred that the polyester component comprises from about 20% to about 70% by weight of reactants in the mixture.

In one especially desirable embodiment of the invention, a multi-functional alcohol is used to terminate the reaction (cap the free isocyanate groups) at the desired stage (determined by the viscosity and isocyanate groups present), thereby also contributing residual hydroxyl groups. Particularly desirable for such purposes are aminoalcohols, such as ethanolamine, diethanolamine and the like, since the amino groups preferentially react with the isocyanate groups present. Multifunctional alcohols, such as ethylene glycol, trimethylolpropane and hydroxyl-terminated polyesters, can also be employed in this manner.

While the ratios of the components of the polyester the multi-functional isocyanate and the terminating agent can be varied, it will be noted by those skilled in the art that the amounts should be chosen so as to avoid gellation and to produce an ungelled, urethane reaction product containing hydroxyl groups. The hydroxyl value of the urethane reaction product should by at least 5 and preferably about 20 to about 200.

The amount of polyisocyanate used in the mixture is preferably between about 20% and 30% by weight of the reactants in the mixture, but will vary depending upon the polyester used, the acid number of the final polyurethane resin, and the desired molecular weight of the final polyurethane resin. The amount of polyisocyanate will also vary depending upon whether it is desired to have the intermediate polyurethane terminated with free isocyanate groups or with hydroxyl groups. Thus, where it is preferred to terminate the intermediate polyurethane resin with free isocyanates for capping with trimethylolpropane or diethanolamine, an excess of polyisocyanate may be used. Where the intermediate polyurethane resin is to be terminated by hydroxyl groups a stoichiometric deficiency of polyisocyanate may be used.

The amount of multi-functional component having at least one active hydrogen group and at least one carboxylic acid group also may vary depending upon the desired acid number of the final polyurethane resin. The final polyurethane resin has an acid number of at least about 10, and the mount of this multi-functional component comprises between about 1% and about 25% by weight of the reactants of polyurethane producing reaction mixture (polyisocyante, polyester, multi-functional compound, and optionally other chain extenders, for example compounds having two active hydrogens but no carboxylic groups). It is preferable that the acid number be higher, because as the acid number increases, the water-dispersibility of the polyurethane resin potentially increases. The practical upper limit of acid number is that which negatively effects the low flash or quick-drying characteristics and physical properties of the final resin. Of course, the upper limit of the acid number will vary depending upon the chemical composition of the final polyurethane resin, but an acid number with an upper limit of about 100 is, in general, the practical limit of polyurethane resins of the present invention.

The amount of chain extender used to produce the polyurethane resin varies between about 2% and 25% by weight of the reactants. The amount used will depend upon the amount of chain extension desired and the desired size of a polyurethane molecule.

After the polyurethane resin is synthesized, the free carboxylic acid groups are neutralized with base to form salt groups. Preferably, the base is an amino containing compound. Tertiary amines are generally preferred over primary and secondary amines because of the tendency of the primary and secondary amines to react with aminoplast cross-linking agents. Preferred tertiary amines include trialkylamines, for example, trimethylamine and triethylamine. Also preferred is triethanolamine. Dimethylethanolamine is particularly preferred.

The polyurethane resin described above can be formulated as a water-dispersed basedcoat resin along with a grind resin, a cross-linking agent, thixotropic or rheology control agents, thickeners, pigments, aluminum and/or mica particles, basifying agents, water, fillers, surfactants, stabilizers, plasticizers, wetting agents, dispersing agents, adhesion promoters, defoamers, catalysts, and additional polymers, for example a branch-chain polyester among other ingredients.

After formulation, the basecoat composition can be sprayed or electrostatically deposited onto the automobile body, preferably, in one or two coats. Generally, two even coats of basecoat are applied with a one minute flash between coats. After deposition of the basecoat, before application of a high solids content clear coat, it is generally preferred to flash about 90% of the water from the basecoat for optimum appearance and to eliminate water boil of the clearcoat.

The polyurethane resins of the present invention are formulated, along with other components, into water dispersible basecoat compositions which are sprayed or electrostatically deposited onto metal or plastic substrates, for example, automobile bodies. In general, an anionic polyurethane principal resin formulated as described herein, is mixed with an aminoplast resin, pigments, and an anionic acrylic grind resin, water, a portion of an organic solvent, aluminum and/or mica particles and a rheology control agent. Other agents may be included, for example, various fillers, surfactants, plasticizers, stabilizers, wetting agents, dispersing agents, defoamers, adhesion promoters and catalysts in minor amounts.

In one preferred embodiment a branched-chain polyester component is also added to the basecoat composition.

As indicated, an aqueous dispersion of the polyurethane resin is utilized as the principal or major vehicle resin. In general, the principal or major vehicle resin comprises between about 5% and about 60% by weight of the total solids present in the basecoat composition. The preferred polyurethane resin is a resin produced from a polyester synthesized from dimer fatty acid, isophthalic acid and 1,6-hexanediol. The resulting polyester is then reacted with a diisocyante of isophorone, dimethylol propionic acid and a diol, for example, neopentyl glycol. The resulting polyurethane intermediate having free isocyanate groups is then reacted with trimethylolpropane to cap these groups.

The polyurethane reaction product as described above is mixed with an aminoplast resin. Aminoplast resins are aldehyde condensation products of melamine, urea, and similar compounds. Products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3-5-diamino-triazole, triaminopyrimidine, 2-mercapto-4,6-diaminopyrimidine, 2,4,6-triethyl triamino-1,3,5-triazine, and the like.

While the aldehyde employed is most often formaldehyde, other similar condensation products can be made from other aldehydes, for example acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols, for example, cyclohexanol, monothers or glycols such as Cellosolves TM and Carbitols TM (Union Carbide), and halogen-substituted or other substituted alcohols, such as 3-chloropropanol. The preferred amine-aldehyde resins are etherified with methanol or butanol.

A grind resin is also used in the basecoat compositions of the present invention. It is preferred that the grind resin be comprised of a copolymer of ethylenically unsaturated monomers, i.e. an acrylic polymer. The grind resin may range between about 2% and about 75% by weight of the total solids in the coating composition and will vary depending on the desired color.

A preferred acrylic resin for use as a grind resin in embodiments of this invention is a cross-linkable acrylic copolymer containing hydroxyl groups and carboxyl groups, having a molecular weight of 30,000 to 70,000 (as determined by light scattering methods or by membrane osmometry), preferably above about 50,000, and a glass transition temperature (Tg) of between about $-20°$ C. and about $+20°$ C., preferably between about $-10°$ C. and $+10°$ C., and preferably an acid number of greater than 30, most preferably between about 30 and about 70.

The acrylic copolymers employed as grind resins in coating compositions of the present invention are made by solution copolymerization of a mixture of monomers consisting of 60% to 90%, by weight of one or more monomers selected from the group consisting of a $C_1$ to $C_{20}$ alkyl acrylates or methacrylates, styrene, and vinyl toluene; 5% to 35% by weight of a reactive monomer of the group consisting of hydroxyethyl, hydroxypropyl and glycidyl esters of acrylic and methacrylic acids, and 5% to 20% by weight of an $\alpha,\beta$-unsaturated carboxylic acid of the group consisting of acrylic acid, methacrylic acid, maleic anhydride and fumaric acid.

Preferred monomers of the first type include styrene butyl acrylate, butyl methacrylate, 2-ethylhexyl acrylate, and 2-ethylhexyl methacrylate.

The amount of $\alpha,\beta$-ethylenically unsaturated carboxylic acid monomer is chosen so that the anionic acrylic copolymer possesses an acid number greater than about 30, preferably between about 30 and 70. Best results, in terms of pigment wetting and dispersion are obtained when the acid number of the anionic acrylic grind resin copolymer ranges between about 30 and 60, most preferably between about 40 and 50.

The reaction between the momomers is controlled by judicial regulation of the amount of polymrization initiator and reaction temperature and time to produce a copolymer having a weight average molecular weight in the range of about 30,000 to about 70,000.

The mixture of monomers chosen to formulate the acrylic copolymer preferably includes alkyl acrylates or alkyl methacrylates in which the alkyl portion contains from four to ten carbons in amounts which range between about 60% to about 90% in order to produce a copolymer which has a $T_g$ ranging between about $-20°$ C. and about $+20°$ C., preferably between about $-10°$ C. and about $+10°$ C., most preferably about $0°$ C.

The copolymer is made by solution polmerization using conventional addition polymerization catalysts such as azoisobutyronitrile, t-butyl peroctoate, benzoyl peroxide, etc. Advantageously, the copolymerization is carried out in a water miscible solvent which becomes part of the coating vehicle formulation, i.e, it is not necessary to separate the polymer in solid form before using it in the coating composition. Solvents which may be used for this reaction are those which are commonly used in coating compositions, such as $C_1$ to $C_{10}$ alcohols, acetone, methyl ethyl ketone, methyl isobutyl ketone, cyclohexanone, butyl acetate, methyl acetate, Cellosolve TM, Carbitol TM, ethylene glycol monobutyl ether, methyl Carbitol TM, butyl Carbitol TM, and combinations thereof. It is of course necessary that the solvent be volatile under the conditions normally used for baking the coating.

The cross-linkable acrylic copolymer is solubilized in the aqueous coating composition by reacting it with a volatile amine. Examples of volatile amines include: a triethyl amine, dimethylaminoethanol, and morpholine. Such basic solubilizing reagents are used to solubilize the copolymer at a pH of 7 to 12, preferably 7 to 9. The preferred solubilizing reagent is dimethylethanolamine.

Another factor contributing to the success of the invention is the relatively low glass transition temperature of the cross-linkable acrylic copolymer. The Tg of the polymer must be low enough to promote more efficient "reflow" of the copolymer film just prior to, or during, cross-linking to produce surface smoothness, thus enhancing the gloss and luster of the final paint film. The glass transition temperature of the polymer is of the order of $-20°$ C. to $+20°$ C. It is preferred that the glass transition temperature of the acrylic grind resin range between $-10°$ C. and $+10°$ C., and is most preferably about $0°$ C. The term "glass transition temperature" as used herein refers to the value calculated from the equation:

$$1/T_g = W_1/T_{g1} + W_2/T_{g2} + \ldots + W_a/T_{ga}$$

where $W_1$, $W_2$ ... $W_a$ are the weight fractions of acrylic monomer in the copolymer, Tg is the glass transition temperature of the copolymer and $T_{g1}$, $T_{g2}$ ... $T_{gn}$ are the glass transition temperatures of the corresponding homopolymers in degrees Kelvin in accordance with the prior art, e.g. Fox, *Bulletin American Phys. Society*, No. 3, 1956.

Pigments may be incorporated into the basecoat to provide the desired cosmetic characteristics. This is done by mixing pigments with the above-described pigment grind resin with other optional additives to form a pigment paste. Any standard pigment known in the art may by used with resins of the present invention so long as these pigments can be formulated without affecting the desired low flash and quick-drying characteristics. Specific examples of the dye stuffs or pigments may be inorganic or organic, for example, graphite, carbon black, zinc chromate, strontium chromate, barium chromate, lead chromate, lead cyanide, titanium dioxide, zinc oxide, cadmium sulfide, iron oxide, zinc sulfide, phthalocyanine complexes, naphthol red, quinacridones and halogenated thioindigo pigments among others.

Reflective particulate pigmenting agents may be incorporated into the basecoat coating compositions of the present invention to obtain an enhanced "metallic veneer" effect. Such reflectice particulates include metallic aluminum flake and particulate micas including particulate micas which have been encapsulated with one or more metal oxides such as iron oxide or titanium dioxide. Preferred metallic pigments include aluminum metal flake materials. Preferred aluminum flake pigments are available from Silberline Corp, Lansford, Pa. or from Eckart Werke, Güntserstahl, FRG. Particulate mica materials are available from E M Chemical (Savannah, Ga.) or Mearl (New York, N.Y.). Other metallic flake pigments may also be used, including silver flake, copper flake, bronze flake, and the like, but these are usually either prohibitive in cost or produce inferior appearance.

The above-mentioned colorants are mixed with the acrylic grind resins of the present invention by conventional techniques such as ball-milling, sand-milling and the like to obtain a pigment paste of the desired consistency and pigment particle size as determined on the Hegman scale.

The resins used in the basecoat are dispersed in deionized water. It is preferred that the deionized water have conductance readings of less than 13 $\mu$mhos and most preferably less than about 5 $\mu$mhos to prevent gassing caused by the reaction of aluminum with water. Gassing reactions between the aqueous solvent and particulate aluminum pigments can be alternatively minimized or prevented by using commercially available aluminum flake which has been surface treated, as for example, with a phosphate ester.

Other solvents may also be employed with the deionized water. An especially preferred solvent is butyl Cellosolve TM which aids mixing, formulating and dispersing the pigment in the basecoat composition. Other solvents can also be used, for example, low-boiling mono- and polyhydric alcohols, ethers, esters, ketones and other organics. The organic solvent, which comprises at most about 20% of the basecoat composition, and preferably comprises about 10% to 15% by weight of the basecoat composition may be selected to promote the dispersibility of individual components in the final basecoat composition and for its low volatitity characteristics.

A rheology control agent is also preferably incorporated into the base coat composition. The rheology control agent controls the viscosity of the resulting composition and is incorporated in amounts that will prevent sagging or running after a basecoat is sprayed onto a vertical surface such as an automobile body. The direct result of incorporating a rheology control agent is to provide flow control, body and sprayability. Other favorable results of adding a rheology control agent are to enhance the flip effect of metallic flake pigments, to deposit a thicker coating, and to achieve complete coverage of a substrate. The sprayed coatings containing these agents also exhibit greater orientation of the metallic flake pigments on the final coated substrate. Rheology control agents which can be used in embodiments of the present invention include the fumed silica compounds and the bentonite clays. Preferred fumed silica compounds are the hydrophobic silica compounds, for example Aerosil ® R972, available from DeGussa Corporation, (Frankfurt, West Germany). Another rheology control agent which may be used, and in certain basecoat compositions may be preferred, is a synthetic sodium lithium magnesium silicate hectorite clay. An example of one such clay is Laponite ® RD, available from Laporte, Inc. (Saddlebrook, N.J.). Rheology control agents, when included, generally comprise about 0.1 to about 20 percent by weight of the basecoat composition and preferably comprise between about 1 percent and about 5 percent by weight of the final basecoat composition.

In general, the particle size of the rheology control agent plays a role in the overall thixotropic properties of these resins. Rheology control agents in embodiments of this invention are suspended in the material. It may be proposed that the rheology control agents are suspended and function, at least in part, through coulombic or electrostatic interactions.

In general, the particle sizes can be from less than 0.1 microns to over about 200 microns. These sizes can be adapted to develop in part the rheology properties sought. In appropriate circumstances, the particle sizes may be from about 0.1 to about 10 microns.

In addition to a principal resin or major vehicle resin and a grind resin, preferred basecoat compositions are also comprised of at least about 5% by weight of the resinous vehicle of a branched-chain polyester resin. The branched-chain polyester is added for improved application properties and improved physical properties (due to increased cross-link density). In general, the branched-chain polyester component is produced from the same components as the polyester component, except that in addition to the long and short chain carboxylic acid components, a small percentage of trifunctional acid or acid anhydride is used. Thus, the carboxylic acid component of the branch-chain polyester is comprised of at least 50% by weight of a long-chain fatty acid, preferably $C_{36}$ dimer fatty acid and no more than about 50% by weight of a combination of a dicarboxylic acid such as isophthalic acid and a small percentage of a trifunctional carboxylic acid such as trimellitic anhydride. In preferred embodiments, the branched chain polyester is synthesized from dimer fatty acid, isophthalic acid, and 1,6-hexanediol. A small percentage, about 5% to about 20% of trimellitic anhydride is added to the polyesterification reaction to branch the polyester. The branched chain polyester is cooked to a final acid number of 10-50, and preferably 20-40. In general, the branched polyester comprises about 20% of the resinous vehicle but may be lower depending on the color.

Any additional agent used, for example, surfactants, fillers, stabilizers, wetting agents, dispersing agents, adhesion promoters, etc. may be incorporated into the basecoat composition. While the agents are well-known in the prior art, the amount used must be carefully controlled to avoid adversely affecting the coating and quick-drying characterisitcs.

In formulating the basecoat compositions of the present invention, the order of addition of the individual components is often very important. As a rule the cross-linking agent in a solvent is added to the rheology control agent in solution and thoroughly mixed. Thereafter, the major vehicle resin dispersion (neutralized with amine) is added to the rheology control solution under agitation. Pigment pastes comprised of an anionic acrylic resin, pigment, fillers, stabilizers, plasticizers and other additives are then mixed under agitation with the above-resulting mixture. Pigment paste particles are prepared in a sand mill, attritor or other common milling equipment prior to use. If desired, a slurry of aluminum metal flakes and/or mica particles mica particles are used alone in the case where an aluminum metallic veneer is not desired) in butyl Cellosolve ™ is mixed with a premixed slurry of a branched-chain polyester resin and dimethylethanolamine. This mixture of aluminum and polyester resin in solvent and amine is then added to the mixture containing resinous vehicle, cross-linking agent, rheology control agent and pigment paste.

The final basecoat composition is adjusted to a pH of 7.6–7.8 with a tertiary amine, for example, N,N-dimethylethanolamine. Viscosity may be adjusted using deionized water. Final basecoat compositions are comprised of the following components in the indicated weight ratios.

TABLE 1

| Ingredient | Amount (% by Weight of Solids of Final Basecoat Composition) |
|---|---|
| Polyurethane Resin | 5–60% |
| Aminoplast Cross-Linking Resin | 5–50% |
| Rheology Control Agent | 0–20% |
| Branched Chain Polyester | 5–35 |
| Acrylic Grind Resin | 2–75% |
| Pigments | 5–30% |

The basecoat compositions described hereinabove can be applied to a metal or plastic substrate in one or more coats using for example an air atomizer (Binks Model 60 spray gun (available from Binks Manufacturing Corporation, Franklin Park, Ill., or by using other conventional spraying means. The basecoat compositions may also be applied electrostatically. The basecoat compositions are preferably sprayed at 50–80 psi, and a relative humidity of between 50 and 90% (optimally at 60–80% relative humidity) and a temperature of 70° F.–90° F. (21° C.–31° C.).

After being deposited, the basecoat compositions are flash dried within a temperature range of about room temperature to about 145° F. (63° C.) for a period of between about 30 seconds and about 10 minutes using warm air blowing at a relative humidity of 5–40%. The preferred flash temperature is about 120° F. (49° C.) which is carried out for preferably between about 1 to 5 minutes. The flash conditions described herein result in about 90–95% of the solvents (water plus organics) being flashed from the basecoat in this short period of time.

After the first basecoat is deposited, a second basecoat can be deposited over the first without drying (flash off), or alternatively, a clearcoat may be deposited over the flashed basecoat. Any number of clearcoat compositions known in the art may be used. Any known unpigmented or other transparently pigmented coating agent is in principle, suitable for used as a clearcoat. A typical top coat composition contains 30–70% film forming resin.

After the clear coat is coated onto the basecoat layer, the multi-layer coating is then baked to cross-link the polymeric vehicle and to drive the small amount of residual water and organic solvent from the multi-layered polymeric composition. A preferred baking step involves heating the coated substrate for a period of 10–60 minutes at a temperature of between 150° F. (66° C.) and 300° F. (149° C.). The baking step cures the coating to a hard, durable film.

The invention will be further described in connection with several examples which follow. These examples are shown by way of illustration of the invention and are not meant to limit the scope of the invention. All parts and percentages in the examples are by weight unless otherwise indicated.

Anionic Polyurethane Principal Resin

EXAMPLE 1

Polyurethane Dispersion 1

A polyester polyol resin was prepared by charging a reaction vessel (flask with a fractionating column) with 551.9 g (15.8% of the polyester resin) of isophthalic acid, 1923 g (54.9%) Empol ® 1010 (dimer fatty acid available from Emery Chemical Co.), and 1025.1 g (29.3%) of 1,6-hexanediol and 100 g of toluene. Additional toluene was added to fill the trap. The mixture was heated under nitrogen and the water of condensation was removed. During this heating 235.7 g of water was distilled off. Heating was continued at approximately 200° C. until the acid number was less than or equal to 8. The remaining toluene was then vacuum stripped at 220 C. to produce a polyester resin for use in preparing the polyurethane resin.

At this point, 697.9 g of the above-synthesized polyester resin, 43.0 g of dimethylolpropionic acid, 16.1 g of neopentylglycol, 234.0 g of isophorone diisocyanate and 300 g of methyl isobutyl ketone were charged to the reactor and heated at reflux (about 128° C.) until a constant isocyanate value was obtained. Trimethylolpropane (36.8 g) was then added to the reactor and the batch was heated under reflux for an additional one hour. At this point, the nitrogen purge was turned off and the batch was cooled to 95° C. Dimethylethanolamine (28.6 g) and 100 g of water were then added using a portion of the water as a rinse. The batch was then allowed to sit until it became homogenous (about 5 minutes) and then 2048.7 g of water was added over a 20 minute period under vigorous agitation.

At the end of this addition the mixture was distilled on high heat with vigorous agitation to remove water and methyl isobutyl ketone. The water was then returned to the batch and the approximately 300 grams of methyl isobutyl ketone which was distilled off was discarded. n-Butanol (238 g) was added and the batch was held at 80° C. for 30 minutes. The batch was then dropped and filtered through a 10 micron filter to give an anionic polyester-polyurethane resin for use as the principal resin in basecoat compositions of the invention. The resulting dispersion had a solids content of 30% and a Gardner viscosity of Z2.

EXAMPLE 2

Polyurethane Dispersion 2

A reaction vessel was charged with 1995 g of adipic acid, 1995 g of dimer acid, 2450 g of 1,6-hexanediol, and 136 g of toluene. The mixture was heated under nitrogen to 209° C., removing water until an acid number of less than 8 was reached. Remaining toluene was vacuum stripped to produce a polyester resin having solids content greater than 98%.

The polyester prepared as described above (857.4 g) was mixed with 14.6 g neopentyl glycol, 53.1 g of dimethylolpropionic acid, 306.5 g of isophorone diioscyanate, 97.1 g of methyl ethyl ketone, and 235.0 g of methyl amyl ketone and the resulting mixture was heated under reflux until a constant isocyanate value was obtained. At this point, 24.8 g of diethanolamine was added and the mixture was held for 30 minutes. Dimethylethanolamine (24.8 g), 116.8 g of deionized water and 118.2 g of isopropyl alcohol were added and the resulting mixture was stirred for 15 minutes. Deionized water (3123.2 g) was then added over a 20 minute period with vigorous agitation. The resulting dispersion had a solids content of 26% and an appropriate Gardner viscosity.

EXAMPLE 3

Polyurethane Dispersion 3

Dimer acid (770 g), 230 g of 1,6-hexanediol, and 25 g of toluene were charged and the resultinq mixture heated to 200° C. Heating was continued, removing water, until an acid number less than 10 was achieved. The remaining toluene was then removed under vacuum.

Seven hundred qrams of the polyester above, 12.6 g of neopentyl glycol, 43 g of dimethylolpropionic acid, 244 g of isophorone diisocyanate, 77.8 g of methyl ethyl ketone, and 195.3 g of methyl amyl ketone were reacted using the procedure described above for Polyurethane Dispersion 2. The resulting dispersion had a solids content of 26% and a Gardner viscosity of Z1.

Branched Polyester

EXAMPLE 4

Branched Polyester 1

Dimer acid (2594. g), 2564 g of 1,6-hexanediol, and 144 g of isophthalic acid were charged to a reaction vessel and the mixture was heated to 195° C. under nitrogen with agitation until acid number of 10 or less was reached. The mixture was then cooled to 150° C. and 1000 g of trimellitic anhydride was added slowly. After addition was complete, the mixture was heated under reflux until an acid number of 30-32 was reached. After cooling to 150° C. or less, 729 g of butyl Cellosolve TM and 459 g of n-butanol were added. The resulting polyester had a solids content of 70% and a Gardner viscosity of U-V.

EXAMPLE 5

Branched Polyester 2

Dimer acid (1230 g) and 769.5 g of 1,6 hexanediol were charged to a reaction vessel and heated to 195° C. under nitrogen with agitation. Heating was continued until an acid number less than 10 was reached. The mixture was then cooled to 150° C. and 420.1 g of trimellitic anhydride was added slowly and the mixture heated until the acid number fell below 30. Butyl glycol (335 g) and 670 g n-butanol were then added with agitation. The resulting polyester solution had a solids content of 70% and a Gardner viscosity of Z1.

EXAMPLE 6

Branched Polyester 3

1,6-Hexanediol (868.7 g), 1346.2 g cf dimer acid, and 386 g of isophthalic acid were heated at 195° C. until an acid number less than 8 was achieved. Trimellitic anhydride (206.6 g) was then added slowly under agitation and heat applied until an acid number less than 30 was achieved. A 2:1 mixture of n-butanol and butyl glycol were then added, until 70% solids was reached. The resulting branched polyester resin had a Gardner viscosity of U.

Anionic Acrylic Grind Resin

EXAMPLE 7

Acrylic Grind Resin Dispersion 1

A solution acrylic resin was prepared by charging a reaction vessel with 350 g of n-butanol and heating to reflux. In a separate vessel, there were mixed 221 g of hydroxyethyl acrylate, 221 g of 2-ethylhexyl acrylate, 67.2 g of acrylic acid, 119.6 g of styrene, 478.8 g of butyl methacrylate, 11.7 g of t-butyl peroctoate, and 150 g of n-butanol. This monomer blend was formulated to have a theoretical acid number of 46.

This blend of monomers was slowly added to the flask containing the refluxing n-butanol over a period of about four hours while maintaining the flask contents at reflux. After the addition of the blend of monomers was complete, the flask contents were heated under reflux for an additional one-half hour, and then 5.8 g of t-butyl peroctoate in 55 g of n-butanol was added over a period of one half hour, after which the flask contents were heated at reflux for one hour.

The flask contents were allowed to cool to about 60° C., at which point a solution of 45 g of dimethylethanolamine in 55 g of deionized water was added to the flask contents and the resulting mixture stirred for fifteen minutes. An additional 1977 g of deionized water was added to the flask contents and stirred for fifteen minutes with high agitation to form a water-borne acrylic dispersion. The resulting mixture was filtered through a 10 micron filter to yield an anionic acrylic grind resin for use as a pigment grind resin in the basecoat coating compositions of the present invention. The resulting dispersions had a solids content of about 30%, an acid value of about 47.5 and a Brookfield viscosity of about 9200 centipoise at a pH of 7.25.

EXAMPLE 8

Acrylic Grind Resin Dispersion 2 n-Butanol (350 g) was charged to a reaction vessel and heated to reflux. In a separate vessel, there were mixed 221 g of hydroxyethyl acrylate, 18.1 g of 2-ethylhexyl acrylate, 67.6 g of acrylic acid, 119.6 g of styrene, 686.5 g of butyl methacrylate, 11.6 g of t-butyl peroctoate, and 150 g of n-butanol. This monomer blend was formulated to have a theoretical acid number of 46.

This blend of monomers was slowly added to the flask containing the refluxing n-butanol over a period of about four hours while maintaining the flask contents at reflux. After addition of the blend of monomers was complete, the flask contents were heated under reflux for an additional one-half hour, and then 5.8 g of t-butyl peroctoate in 50 g of n-butanol was added over a period of one hour, after which the flask contents were heated at reflux for an additional hour.

The flask contents were allowed to cool to about 70° C., at which point a solution of 45.2 g of dimethylethanolamine in 50 g of deionized water was added to the flask contents and the resulting mixture stirred for fifteen minutes. An additional 1977 g of deionized water was added to the flask contents and stirred for fifteen minutes with high agitation to form a water-borne acrylic dispersion. The resulting mixture is filtered through a 10 micron filter to yield an anionic acrylic grind resin for use as a pigment grind resin in coating compositions of the present invention. The resulting dispersions had a solids content of about 30%, an acid value of about 47.5 and a Brookfield viscosity of about 16,200 centipoises at a pH of 7.15.

EXAMPLE 9

Acrylic Grind Resin Dispersion 3

A reaction vessel was charged with 1000 g of n-butanol and the alcohol heated to reflux. In a separate vessel, 442 g of hydroxyethyl acrylate, 401.8 g of 2-ethylhexyl acrylate, 90 g of acrylic acid, 238 g of styrene, 1101 g of butyl methacrylate, and 25.5 g of t-butyl peroctoate were mixed. This blend of monomers was formulated to have a theoretical acid number of about 30.

This blend of monomers was slowly added to the flask containing the refluxing n-butanol over a period of about four hours while maintaining the flask contents at reflux. After addition of the blend of monomers was complete, the flask contents were heated under reflux for an additional one-half hour, and then 11.6 g of t-butyl peroctoate in 110 g of n-butanol was added over a period of one hour, after which the flask contents were heated at reflux for an additional hour.

The flask contents were allowed to cool to about 65° C., at which point a solution of 84 g of dimethylethanolamine in 50 g of deionized water was added to the flask contents and the resulting mixture stirred for fifteen minutes. An additional 4054 g of deionized water was added to the flask contents and stirred for fifteen minutes with high agitation to form a water-borne acrylic dispersion. The resulting mixture is filtered through a 10 micron filter to yield an anionic acrylic grind resin for use as a pigment grind resin in coating compositions of the present invention. The resulting dispersions had a solids content of about 30%, an acid value of about 30.4 and a Brookfield viscosity of about 5,800 centipoise at a pH of 8.4.

PIGMENT PASTES

EXAMPLE 10

Phthalo Blue Pigment Paste

Acrylic dispersion 1 from Example 7 (8044 g), 845 g of deionized water, and 857 g of phthalocyanine blue pigment were mixed at high agitation for thirty minutes. The viscosity was then adjusted to about 66 Krebb Units (KU) with 254 g of deionized water before being ground in a sand mill. After three passes through the sand mill, a Hegman grind reading of about 7.25 was obtained. The final paste had a viscosity of about 129 KU at a pH of 8.3 with a solids content of 32.0% (24.1% acrylic grind resin and 8.6% pigment).

EXAMPLE 11

Perylene Pigment Paste

Acrylic dispersion 2 from Example 8 (7596 g), and 1189 g of perylene pigment were mixed at high agitation for thirty minutes. The viscosity was then adjusted to about 58 Krebb Units (KU) with 1215 g of deionized water. After two passes through a horizontal mill, a Hegman grind reading of about 7.5 was obtained. The final paste had a viscosity of about 110 KU at a pH of 7.8 with a solids content of 34.4% (22.5% acrylic grind resin and 11.9% pigment).

EXAMPLE 12

Carbon Black Pigment Paste

Acrylic dispersion 3 from Example 9 (7866 g), 1296 g of deionized water, and 838 g of carbon black pigment were mixed at high agitation for thirty minutes. The viscosity was about 67 Krebb Units (KU). After four passes through a sand mill, a Hegman grind reading of about 7.25 was obtained. The final paste had a viscosity of about 85 KU at a pH of 8.2 with a solids content of 32.0% (23.6% acrylic grind resin and 8.4% pigment).

EXAMPLE 13

Transparent Iron Oxide Pigment Paste

Acrylic dispersion 2 from Example 8 (7206 g) and 1452 g of transparent iron oxide pigment were mixed at high agitation for thirty minutes. The viscosity was adjusted to about 85 Krebb Units (KU) by the addition of 1342 g of deionized water. The resulting paste was run in an attritor for 18 hours to obtain a Hegman grind reading of about 8.0. The final paste had a viscosity of about 62 KU at a pH of 8.3 with a solids content of 35.9% (21.4% acrylic grind resin and 14.5% pigment).

PREPARATION OF COATING AGENTS

EXAMPLES 14–19

Examples of coating compositions of the present invention are presented in Table 2. In general, the compositions are prepared by premixing the melamine resin and butyl cellosolve prior to addition to the thickener. In Example 16, the deionized water is added to the thickener before mixing with the melamine/butyl cellosolve mixture.

The polyurethane principal resin dispersion is then added to the mixture of melamine, butyl cellosolve, and thickener with stirring. Next, the pigment pastes are added with stirring. In the cases of aluminum- or mica-containing coatings, the particulate pigmenting agents are separately mixed with butyl cellosolve, after which polyester is added, neutralizing the resulting mixture with 5% aqueous dimethylethanolamine. The resulting aluminum- or mica-containing slurry is then added with to the mixture of thickener, melamine resin, polyurethane principal resin, and pigment paste. The pH of the final mixture in each case is adjusted to about pH 7.6 to pH 7.8 by the addition of dimethyl-ethanolamine and the viscosity adjusted to the desired value for sprayability by the addition of deionized water.

The composition of the coating agents is shown in Table 2, where the numbers denote parts by weight. The following notes refer to components listed there:

Thickener 1: Paste of synthetic sodium lithium magnesium silicate hectorite clay, Laponite RD (Laporte), 2% strength in deionized water; the paste is prepared by stirring with Cowles blade in water for one hour.

Thickener 2: Paste of Laponite RD, 3% strength in deionized water, prepared as described above for Thickner 1.

Thickener 3: Paste of 2.5% Laponite RD and 1.0% Pluriol P1010 (BASF AG, Ludwigshafen, FRG) in deionized water. This paste is prepared by mixing the Laponite and half of the deionized water for one hour with a Cowles blade, after which the Pluriol P1010 is mixed in for one-half hour followed by the remainder of the deionized water. Mixing is then continued for one hour.

Aluminum Pigment 1: Aqua Paste 5245, phosphate ester treated aluminum (Silberline, Hometown, Pa.).

Aluminum Pigment 2: Aqua Paste 3141, phosphate ester treated aluminum (Silberline, Hometown, PA).

Mica Pigment 1: Iron oxide coated mica 359Z (Mearl Corp.)

Mica Pigment 2: Iron oxide coated mica 9504 (E M Chemicals).

Melamine Resin: Commercially available methanol etherified melamine/formaldehyde resin, solids content 90% by weight in n-butanol.

TABLE 2

| Component (Parts by Weight) | Coating Composition Example | | | | | |
|---|---|---|---|---|---|---|
| | 14 | 15 | 16 | 17 | 18 | 19 |
| Thickener I | 381 | — | — | — | 313 | — |
| Thickener II | — | — | 267 | — | — | — |
| Deionized Water | — | — | 53 | — | — | — |
| Thickener III | — | 282 | — | 316 | — | 255 |
| Melamine resin | 42 | 52 | 45 | 44 | 46 | 47 |
| Ethylene glycol monobutyl ether (butyl cellosolve) | 11 | 13 | 11 | 11 | 12 | 12 |
| Polyurethane principal resin of Example 1 (30% non-volatile content) | 370 | 322 | — | — | 158 | — |
| Polyurethane principal resin of Example 2 (26% non-volatile content) | — | — | 422 | — | — | — |
| Polyurethane principal resin of Example 3 (26% non-volatile content) | — | — | — | 448 | — | 316 |
| Phthalocyanine blue pigment paste of Example 10 | 19 | 147 | 41 | 4 | — | — |
| Carbon black pigment paste of Example 12 | 34 | 38 | 3 | 4 | 28 | 13 |
| Perylene pigment paste of Example 11 | — | — | — | — | 271 | 123 |
| Transparent iron oxide pigment paste of Example 13 | — | — | — | — | 48 | 66 |
| Phosphate ester treated aluminum flake pigment I (65% non-volatile content) | — | — | 50 | 61 | — | — |
| Phosphate ester treated aluminum flake pigment II (65% non-volatile content) | 46 | 19 | — | — | — | — |
| Transparent iron oxide coated mica | — | — | — | — | 12 | 44 |
| Transparent iron oxide coated mica | — | — | — | — | 3 | — |
| Ethylene glycol monobutyl ether (butyl cellosolve) | 21 | 33 | 28 | 33 | 25 | 38 |

TABLE 2-continued

| Component (Parts by Weight) | Coating Composition Example | | | | | |
|---|---|---|---|---|---|---|
| | 14 | 15 | 16 | 17 | 18 | 19 |
| Polyester I of Example 4 (70% non-volatile content) | 54 | 67 | — | — | 60 | — |
| Polyester II of Example 5 (70% non-volatile content) | — | — | — | — | — | −62 |
| Polyester III of Example 6 (70% non-volatile content) | — | — | 57 | 56 | — | — |
| Dimethylethanolamine (5% in deionized water) | 22 | 27 | 23 | 23 | 24 | 25 |
| | 1000 | 1000 | 1000 | 1000 | 1000 | 1000 |

We claim:

1. An aqueous-based basecoat composition suitable for deposition onto a metal or plastic substrate comprising:
   (A) anionic polyurethane principal resin, present in an amount of from about 5% to 60% by weight of the final solids content of said basecoat composition, said anionic polyurethane resin comprising the reaction product of:
      (1) a polyester component comprised of the reaction product of
         (a) a carboxylic acid component wherein said carboxylic acid component is comprised of at least about 50% by weight of at least one long-chain carboxylic acid of from between 18 and 60 carbon atoms, and at least one short-chain dicarboxylic acid; and
         (b) an alcohol having at least two hydroxyl groups;
      (2) a multi-functional compound having at least one active hydrogen and at least one carboxylic acid functionality;
      (3) a compound having at least two active hydrogen groups selected from the group consisting of hydroxyl, sulfhydryl, primary amines accounting for one active hydrogen; and
      (4) a polyisocyanate;
   (B) an aminoplast cross-linking resin, present in an amount of from about 5% to 50% by weight of the final solids content of said basecoat composition;
   (C) a branched chain polyester resin, present in an amount of from about 5% to 35% by weight of the final so-lids content of said basecoat composition, said branched chain polyester resin comprising the reaction product of:
      (1) a polyester component comprising the reaction product of:
         (a) a carboxylic acid component comprised of at least 50% by weight of at least one long-chain carboxylic acid of from 18 to 60 carbon atoms, and not more than 50% by weight of at least one short-chain dicarboxylic acid; and
         (b) an alcohol component having an average functionality of at least 2; and
      (2) a polyfunctional carboxylic acid or acid anhydride, present in an amount of from about 2% to 25% by weight of the final solids content of said basecoat composition, said polyfunctional carboxylic acid or acid anhydride having at least three carboxylic acid groups or incipient carboxylic acid groups present as anhydride functionalities; and
   (D) an anionic acrylic pigment grind resin, present in an amount of from about 2% to 75% by weight of the final solids content of said basecoat composition, said grind resin comprising the reaction product of:
      (1) from about 60% to about 90% by weight of one or more monomers selected from the group consisting of $C_1-C_{20}$ alkyl acrylates, $C_1-C_{20}$ alkyl methacrylates, styrene, and vinyltoluene;
      (2) from about 5% to about 35% by weight of one or more reactive monomers selected from the group consisting of hydroxyethyl acrylate, hydroxyethyl methacrylate, hydroxypropyl acrylate, hydroxypropyl methacrylate, the glycidyl ester of acrylic acid, and the glycidyl ester of methacrylic acid;
      (3) from about 5% to about 20% by weight of one or more $\alpha,\beta$-ethylenically unsaturated carboxylic acids or acid anhydrides selected from the group consisting of acrylic acid, methacrylic acid, maleic anhydride, and fumaric acid;
   said aqueous-based basecoat coating composition having a humidity window of application between about 50% and 90% relative humidity, and improved shelf-life and color stability.

2. An aqueous-based basecoat coating composition as defined in claim 1 wherein the long-chain carboxylic acid of from 18 to 60 carbon atoms comprises from about 50% to about 80% of said carboxylic acid component employed to produce said polyester component of said anionic polyurethane principal resin.

3. An aqueous-based basecoat coating composition as defined in claim 2 wherein said long-chain carboxylic acid of from 18 to 60 carbon atoms is $C_{36}$ dimer fatty acid.

4. An aqueous-based basecoat coating composition as defined in claim 1 wherein said short-chain dicarboxylic acid of said carboxylic acid component employed to produce said polyester component of said anionic polyurethane principal resin contains less than twelve carbon atoms and is selected from the group consisting of alkylene dicarboxylic acids, aralkylene dicarboxylic acids, and acid anhydrides.

5. An aqueous-based basecoat coating composition as defined in claim 4 wherein said short-chain dicarboxylic acid is selected from the group consisting of adipic acid, azelaic acid, isophthalic acid, and trimellitic anhydride.

6. An aqueous-based basecoat coating composition as defined in claim 1 wherein said multi-functional compound is selected from the group consisting of compounds having the formula:

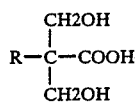

wherein R is selected from hydrogen, hydroxymethyl, or alkyl of from one to twenty carbon atoms.

7. An aqueous-based basecoat coating composition as defined in claim 6 wherein said multi-functional compound is selected from the group consisting of 2,2-bis-(hydroxymethyl)acetic acid, 2,2,2-tris-(hydroxymethyl)acetic acid, 2,2-bis-(hydroxymethyl)propionic acid, 2,2-bis-(hydroxymethyl)-butyric acid, and 2,2-bis-(hydroxymethyl)pentanoic acid.

8. An aqueous-based basecoat coating composition as defined in claim 7 wherein said multi-functional compound is dimethylolpropionic acid.

9. An aqueous-based basecoat coating composition as defined in claim 1 wherein said polyisocyanate is an aliphatic diisocyanate.

10. An aqueous-based basecoat coating composition as defined in claim 1 wherein said polyisocyanate is selected from the group consisting of 1,6-hexamethylene diisocyanate, 1,4-butylene diisocyanate, methylene-bis-(4-cyclohexylisocyanate), and isophorone diisocyanate.

11. An aqueous-based basecoat coating composition as defined in claim 10 wherein said polyisocyanate is isophorone diisocyanate.

12. An aqueous-based basecoat coating composition as defined in claim 1 wherein said anionic acrylic grind resin is of a molecular weight of between about 30,000 and about 70,000.

13. An aqueous-based basecoat coating composition as defined in claim 1 wherein said anionic acrylic grind resin has an acid number of between about 30 and about 70.

14. An aqueous-based basecoat coating composition as defined in claim 1 wherein said anionic acrylic grind resin has a thermal glass transition temperature, $T_g$, of between about $-20°$ C. and $+20°$ C.

15. An aqueous-based basecoat coating composition as defined in claim 14 wherein said anionic acrylic grind resin has a thermal glass transition temperature, $T_g$, of between about $-10°$ C. and $+10°$ C.

16. An aqueous-based basecoat coating composition as defined in claim 1 further comprising from about 0.1% by weight to about 20% by weight of a rheology control agent.

17. An aqueous-based basecoat coating composition as defined in claim 16 wherein said rheology control agent is selected from the group consisting of fumed silicas, bentonite clays, and hectorite clays.

18. An aqueous-based basecoat coating composition as defined in claim 17 wherein said rheology control agent is a purified sodium lithium magnesium silicate hectorite clay.

19. A multi-layer aqueous-based coating system comprising:
(A) at least one aqueous-based basecoat comprising
(1) an anionic polyurethane principal resin, present in an amount of from about 5% to 60% by weight of the final solids content of said basecoat composition, said anionic polyurethane resin comprising the reaction product of:
(a) a polyester component comprised of the reaction product of
(i) a carboxylic acid component and an alcohol having at least two hydroxyl groups, wherein said carboxylic acid component is comprised of at least about 50% by weight of at least one long-chain carboxylic acid of from between 18 and 60 carbon atoms, and at least one short-chain dicarboxylic acid; and
(ii) an alcohol having at least two hydroxyl groups;
(b) a multi-functional compound having at least one active hydrogen and at least one carboxylic acid functionality;
(c) a compound having at least two active hydrogen groups selected from the group consisting of hydroxyl, sulfhydryl, primary amine, and secondary amine, said primary amines accounting for one active hydrogen; and
(d) a polyisocyanate;
(2) an aminoplast cross-linking resin, present in an amount of from about: 5% to 50% by weight of the final solids content of said basecoat composition;
(3) a branched chain polyester resin, present in an amount of from about 5% to 35% by weight of the final solids content of said basecoat composition, said branched chain polyester resin comprising the reaction product of:
(a) a polyester component comprising the reaction product of:
(i) a carboxylic acid component comprised of at least 50% by weight of at least one long-chain carboxylic acid of from 18 to 60 carbon atoms, and not more than 50% by weight of at least one short-chain dicarboxylic acid; and
(ii) an alcohol component having an average functionality of at least 2; and
(b) a polyfunctional carboxylic acid or acid anhydride, present in an amount of from about 2% to 25% by weight of the final solids content of said basecoat composition, said polyfunctional carboxylic acid or acid anhydride having at least three carboxylic acid groups or incipient carboxylic acid groups present as anhydride functionalities; and
(4) an anionic acrylic pigment grind resin, present in an amount of from about 2% to 75% by weight of the final solids content of said basecoat composition, said grind resin comprising the reaction product of:
(a) from about 60% to about 90% by weight of one or more monomers selected from the group consisting of $C_1$–$C_{20}$ alkyl acrylates, $C_1$–$C_{20}$ alkyl methacrylates, styrene, and vinyltoluene;
(b) from about 5% to about 35% by weight of one or more reactive monomers selected from the group consisting of hydroxyethyl acrylate, hydroxyethyl methacrylate, hydroxypropyl acrylate, hydroxypropyl methacrylate, the glycidyl ester of acrylic acid, and the glycidyl ester of methacrylic acid;
(c) from about 5% to about 20% by weight of one or more $\alpha,\beta$-ethylenically unsaturated carboxylic acids or acid anhydrides selected from the group consisting of acrylic acid, methacrylic acid, maleic anhydride, and fumaric acid; and
(B) a clear topcoat for overcoating said basecoat.

20. A method of coating metal or plastic substrates comprising the steps of:
(A) applying to said substrate at least one basecoat layer comprising
  (1) an anionic polyurethane principal resin, present in an amount of from about 5% to 60% by weight of the final solids content of said basecoat composition, said anionic polyurethane resin comprising the reaction product of:
    (a) a polyester component comprised of the reaction product of
      (i) a carboxylic acid component and an alcohol having at least two hydroxyl groups, wherein said carboxylic acid component is comprised of at least about 50% by weight of at least one long-chain carboxylic acid of from between 18 and 60 carbon atoms, and at least one short-chain dicarboxylic acid; and
      (ii) an alcohol having at least two hydroxyl groups;
    (b) a multi-functional compound having at least one active hydrogen and at least one carboxylic acid functionality;
    (c) a compound having at least two active hydrogen groups selected from the group consisting of hydroxyl, sulfhydryl, primary amine, and secondary amine, said primary amines accounting for one active hydrogen; and
    (d) a polyisocyanate;
  (2) an aminoplast cross-linking resin, present in an amount of from about 5% to 50% by weight of the final solids content of said basecoat composition;
  (3) a branched chain polyester resin, present in an amount of from about 5% to 35% by weight of the final solids content of said basecoat composition, said branched chain polyester resin comprising the reaction product of:
    (a) a polyester component comprising the reaction product of:
      (i) a carboxylic acid component comprised of at least 50% by weight of at least one long-chain carboxylic acid of from 18 to 60 carbon atoms, and not more than 50% by weight of at least one short-chain dicarboxylic acid; and
      (ii) an alcohol component having an average functionality of at least 2; and
    (b) a polyfunctional carboxylic acid or acid anhydride, present in an amount of from about 2% to 25% by weight of the final solids content of said basecoat composition, said polyfunctional carboxylic acid or acid anhydride having at least three carboxylic acid groups or incipient carboxylic acid groups present as anhydride functionalities; and
  (4) an anionic acrylic pigment grind resin, present in an amount of from about 2% to 75% by weight of the final solids content of said basecoat composition, said grind resin comprising the reaction product of:
    (a) from about 60% to about 90% by weight of one or more monomers selected from the group consisting of $C_1$-$C_{20}$ alkyl acrylates, $C_1$-$C_{20}$ alkyl methacrylates, styrene, and vinyltoluene;
    (b) from about 5% to about 35% by weight of one or more reactive monomers selected from the group consisting of hydroxyethyl acrylate, hydroxyethyl methacrylate, hydroxypropyl acrylate, hydroxypropyl methacrylate, the glycidyl ester of acrylic acid, and the glycidyl ester of methacrylic acid;
    (c) from about 5% to about 20% by weight of one or more $\alpha,\beta$-ethylenically unsaturated carboxylic acids or acid anhydrides selected from the group consisting of acrylic acid, methacrylic acid, maleic anhydride, and fumaric acid; and
(B) flash drying said basecoat layers;
(C) applying at least one layer of a clear topcoat; and
(D) curing said basecoat layers and said topcoat to a hard, durable finish.

21. A method as defined in claim 20 wherein said step of applying to said substrate at least one basecoat layer is carried out at ambient humidities of between about 50% and 90% relative humidity.

22. A multi-coated metal or plastic substrate comprising a substrate coated with at least one aqueous-based basecoat coating composition comprising:
(A) an anionic polyurethane principal resin, present in an amount of from about 5% to 60% by weight of the final solids content of said basecoat composition, said anionic polyurethane resin comprising the reaction product of:
  (1) a polyester component comprised of the reaction product of
    (a) a carboxylic acid component and an alcohol having at least two hydroxyl groups, wherein said carboxylic acid component is comprised of at least about 50% by weight of at least one long-chain carboxylic acid of from between 18 and 60 carbon atoms, and at least one short-chain dicarboxylic acid; and
    (b) an alcohol having at least two hydroxyl groups;
  (2) a multi-functional compound having at least one active hydrogen and at least one carboxylic acid functionality;
  (3) a compound having at least two active hydrogen groups selected from the group consisting of hydroxyl, sulfhydryl, primary amine, and secondary amine, said primary amines accounting for one active hydrogen; and
  (4) a polyisocyanate;
(B) an aminoplast cross-linking resin, present in an amount of from about 5% to 50% by weight of the final solids content of said basecoat composition;
(C) a branched chain polyester resin, present in an amount of from about 5% to 35% by weight of the final solids content of said basecoat composition, said branched chain polyester resin comprising the reaction product of:
  (1) a polyester component comprising the reaction product of:
    (a) a carboxylic acid component comprised of at least 50% by weight of at least one long-chain carboxylic acid of from 18 to 60 carbon atoms, and not more than 50% by weight of at least one short-chain dicarboxylic acid; and (b) an alcohol component having an average functionality of at least 2; and (2) a polyfunctional carboxylic acid or acid anhydride, present in an amount of from about 2% to 25% by weight of the final solids content of said basecoat composition, said polyfunctional carboxylic acid or acid anhydride having at least three carboxylic acid groups or incipient carboxylic acid groups present as anhydride functionalities; and (D) an anionic acrylic pigment grind resin, present in an amount of from about 2% to 75% by weight of the final solids content of said basecoat composition, said grind resin comprising the reaction product of:

(1) from about 60% to about 90% by weight of one or more monomers selected from the group consisting of $C_1$–$C_{20}$ alkyl acrylates, $C_1$–$C_{20}$ alkyl methacrylates, styrene, and vinyltoluene;

(2) from about 5% to about 35% by weight of one or more reactive monomers selected from the group consisting of hydroxyethyl acrylate, hydroxyethyl methacrylate, hydroxypropyl acrylate, hydroxypropyl methacrylate, the glycidyl ester of acrylic acid, and the glycidyl ester of methacrylic acid;

(3) from about 5% to about 20% by weight of one or more $\alpha,\beta$-ethylenically unsaturated carboxylic acids or acid anhydrides selected from the group consisting of acrylic acid, methacrylic acid, maleic anhydride, and fumaric acid.

* * * * *